United States Patent
Tanaka et al.

(10) Patent No.: US 11,666,991 B2
(45) Date of Patent: Jun. 6, 2023

(54) LASER MACHINING APPARATUS AND LASER MACHINING METHOD

(71) Applicant: AMADA CO., LTD., Kanagawa (JP)

(72) Inventors: Yoichi Tanaka, Kanagawa (JP); Chiaki Kawahara, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 148 days.

(21) Appl. No.: 17/285,169

(22) PCT Filed: Oct. 8, 2019

(86) PCT No.: PCT/JP2019/039596
§ 371 (c)(1),
(2) Date: Apr. 14, 2021

(87) PCT Pub. No.: WO2020/085073
PCT Pub. Date: Apr. 30, 2020

(65) Prior Publication Data
US 2021/0339342 A1 Nov. 4, 2021

(30) Foreign Application Priority Data
Oct. 22, 2018 (JP) .............................. JP2018-198451

(51) Int. Cl.
*B23K 26/38* (2014.01)
*B23K 26/082* (2014.01)
(Continued)

(52) U.S. Cl.
CPC ............ *B23K 26/38* (2013.01); *B23K 26/082* (2015.10); *B23K 26/702* (2015.10); *B23K 2101/18* (2018.08)

(58) Field of Classification Search
CPC .. B23K 26/702; B23K 26/0884; B23K 26/38; B23K 26/082; B23K 37/0408
See application file for complete search history.

(56) References Cited

U.S. PATENT DOCUMENTS 5,585,018 A    12/1996   Kanaoka

FOREIGN PATENT DOCUMENTS

| JP | 7-232289 A | 9/1995 |
| JP | 9-267187 A | 10/1997 |

(Continued)

OTHER PUBLICATIONS

Extended European Search Report for corresponding EP Application No. 19874971.5 dated Nov. 26, 2021.

(Continued)

*Primary Examiner* — Thien S Tran
(74) *Attorney, Agent, or Firm* — Renner, Otto, Boisselle & Sklar, LLP

(57) ABSTRACT

A moving mechanism relatively moves a machining head emitting a laser beam, with respect to a sheet metal along a surface of the sheet metal. A beam vibrating mechanism vibrates the laser beam for irradiation on the sheet metal in a predetermined vibration pattern, while the machining head is relatively moved by the moving mechanism. A vibration control section controls the beam vibrating mechanism to progressively reduce an amplitude of the vibration pattern from a first position to a corner portion when the machining head moves toward the corner portion and reaches the first position before the corner portion by a predetermined distance, and progressively increase the amplitude of the vibration pattern until the machining head reaches a second position ahead of the corner portion by the predetermined distance from the corner portion, at a time of producing a product having the corner portion.

4 Claims, 13 Drawing Sheets

(51) Int. Cl.
*B23K 26/70* (2014.01)
*B23K 101/18* (2006.01)

(56) References Cited

FOREIGN PATENT DOCUMENTS

| | | |
|---|---|---|
| JP | 2014-217875 A | 11/2014 |
| JP | WO2019176631 A1 * | 3/2019 |
| WO | 2019/176431 A1 | 9/2019 |
| WO | 2019/176631 A1 | 9/2019 |

OTHER PUBLICATIONS

International Search Report for corresponding Application No. PCT/JP2019/039596, dated Nov. 26, 2019.
Written Opinion for corresponding Application No. PCT/JP2019/039596, dated Nov. 26, 2019.
T. Heston, Shaping the laser beam for the best cut, The Fabricator 67, Jan. 4, 2017.

* cited by examiner

FIG. 8

[MACHINING CONDITION FILE NAME] C-SUS3.0 [LASER OSCILLATOR NAME]...
[MATERIAL]... [THICKNESS]... [NOZZLE TYPE]... [NOZZLE DIAMETER]... [FOCUSING LENS FOCAL LENGTH]...

| CONDITION No. | VELOCITY | OUTPUT | FREQUENCY | DUTY | GAS PRESSURE | GAS TYPE | NOZZLE GAP | TOOL RADIUS COMPENSATION AMOUNT | FOCUS COMPENSATION AMOUNT |
|---|---|---|---|---|---|---|---|---|---|
| 1 | 400 | 2000 | 200 | 35 | 1.6 | 4 | 0.7 | 0.08 | 0.00 |
| 2 | 1500 | 2000 | 1000 | 60 | 1.6 | 4 | 0.5 | 0.08 | 0.00 |
| 3 | 4500 | 2000 | 4000 | 100 | 1.6 | 4 | 0.3 | 0.08 | 0.00 |
| 4 | 5000 | 2000 | 4000 | 100 | 1.6 | 4 | 0.3 | 0.08 | 0.00 |
| 5 | 3000 | 2000 | 3500 | 100 | 1.6 | 4 | 0.3 | 0.08 | 0.00 |
| ... | ... | ... | ... | ... | ... | ... | ... | ... | ... |

FIG. 9

| VIBRATION PATTERN NUMBER | VIBRATION PATTERN NAME | FREQUENCY RATIO | | PHASE DIFFERENCE |
| --- | --- | --- | --- | --- |
| | | x-DIRECTION | y-DIRECTION | |
| 0 | NO VIBRATION | 0 | 0 | 0 |
| 1 | PARALLEL VIBRATION PATTERN | 1 | 0 | 0 |
| 2 | ORTHOGONAL VIBRATION PATTERN | 0 | 1 | 0 |
| 3 | CIRCULAR VIBRATION PATTERN | 1 | 1 | 0 |
| 4 | C-SHAPED VIBRATION PATTERN | 2 | 1 | 90 |
| 5 | 8-SHAPED VIBRATION PATTERN | 2 | 1 | 0 |
| ⋮ | ⋮ | ⋮ | ⋮ | ⋮ |

FIG. 10

| E-NUMBER | VELOCITY | OUTPUT | ... | VIBRATION PATTERN NUMBER | Qx | Qy | FREQUENCY |
|---|---|---|---|---|---|---|---|
| E1 | 400 | 2000 | ... | 0 | 0 | 0 | 0 |
| E2 | 1500 | 2000 | ... | 3 | 90 | 90 | 3000 |
| E3 | 4500 | 2000 | ... | 4 | 80 | 200 | 1500 |
| E4 | 5000 | 2000 | ... | 1 | 150 | 0 | 2000 |
| E5 | 3000 | 2000 | ... | 2 | 0 | 300 | 2500 |
| ... | ... | ... | ... | ... | ... | ... | ... |

LASER MACHINING APPARATUS AND LASER MACHINING METHOD

TECHNICAL FIELD

The present disclosure relates to a laser machining apparatus and a laser machining method.

BACKGROUND ART

Laser machining apparatuses that cut sheet metals by laser beams emitted from laser oscillators, and produce products having predetermined shapes are widely used. In Non-Patent Literature 1, it is described that a sheet metal is cut while vibrating a laser beam in a predetermined vibration pattern.

CITATION LIST

Non-Patent Literature

Non-Patent Literature 1: January 2017 The FABRICATOR 67, Shaping the Beam for the Best Cut

SUMMARY

A laser machining apparatus may cut a sheet metal to produce a product having a corner. If the laser machining apparatus cuts the sheet metal while vibrating the laser beam in a predetermined vibration pattern at this time, the laser machining apparatus cannot cut the corner of the product with high precision, and machining defect may occur. One or more embodiments has or have an object to provide a laser machining apparatus and a laser machining method that can cut a corner of a product with high precision when cutting a sheet metal while vibrating a laser beam in a predetermined vibration pattern.

According to a first aspect of one or more embodiments, a laser machining apparatus is provided, which includes a moving mechanism configured to relatively move a machining head emitting a laser beam, with respect to a sheet metal along a surface of the sheet metal, a beam vibrating mechanism configured to vibrate the laser beam for irradiation on the sheet metal in a predetermined vibration pattern, while the machining head is relatively moved by the moving mechanism, and a vibration control section configured to control the beam vibrating mechanism to progressively reduce an amplitude of the vibration pattern from a first position to a corner portion when the machining head moves toward the corner portion and reaches the first position before the corner portion by a predetermined distance, and to progressively increase the amplitude of the vibration pattern until the machining head reaches a second position ahead of the corner portion by the predetermined distance from the corner portion, at a time of producing a product having the corner portion by cutting the sheet metal by irradiating the sheet metal with the laser beam vibrated in the vibration pattern.

According to a second aspect of one or more embodiments, a laser machining method is provided, which includes relatively moving, by a moving mechanism, a machining head emitting a laser bean, with respect to a sheet metal along a surface of the sheet metal, vibrating, by a beam vibrating mechanism, the laser beam for irradiation on the sheet metal in a predetermined vibration pattern, while the machining head is relatively moved by the moving mechanism, and controlling, by a vibration control section, the beam vibrating mechanism to progressively reduce an amplitude of the vibration pattern from a first position to a corner portion when the machining head moves toward the corner portion and reaches the first position before the corner portion by a predetermined distance, and to progressively increase the amplitude of the vibration pattern until the machining head reaches a second position ahead of the corner portion by the predetermined distance from the corner portion, at a time of producing a product having the corner portion by cutting the sheet metal by irradiating the sheet metal with the laser bean vibrated in the vibration pattern.

According to the laser machining apparatus and the laser machining method of one or more embodiments, it is possible to cut the corner of the product with high precision when cutting a sheet metal by vibrating a laser beam in a predetermined vibration pattern.

BRIEF DESCRIPTION OF DRAWINGS

FIG. 8 is a diagram illustrating one example of a machining condition file.

FIG. 9 is a table showing a first parameter for determining each vibration pattern.

FIG. 10 is a table showing a setting list for setting a vibration pattern number and a second parameter for determining each vibration pattern correspondingly to each machining condition number.

DESCRIPTION OF EMBODIMENT

Figure 1:
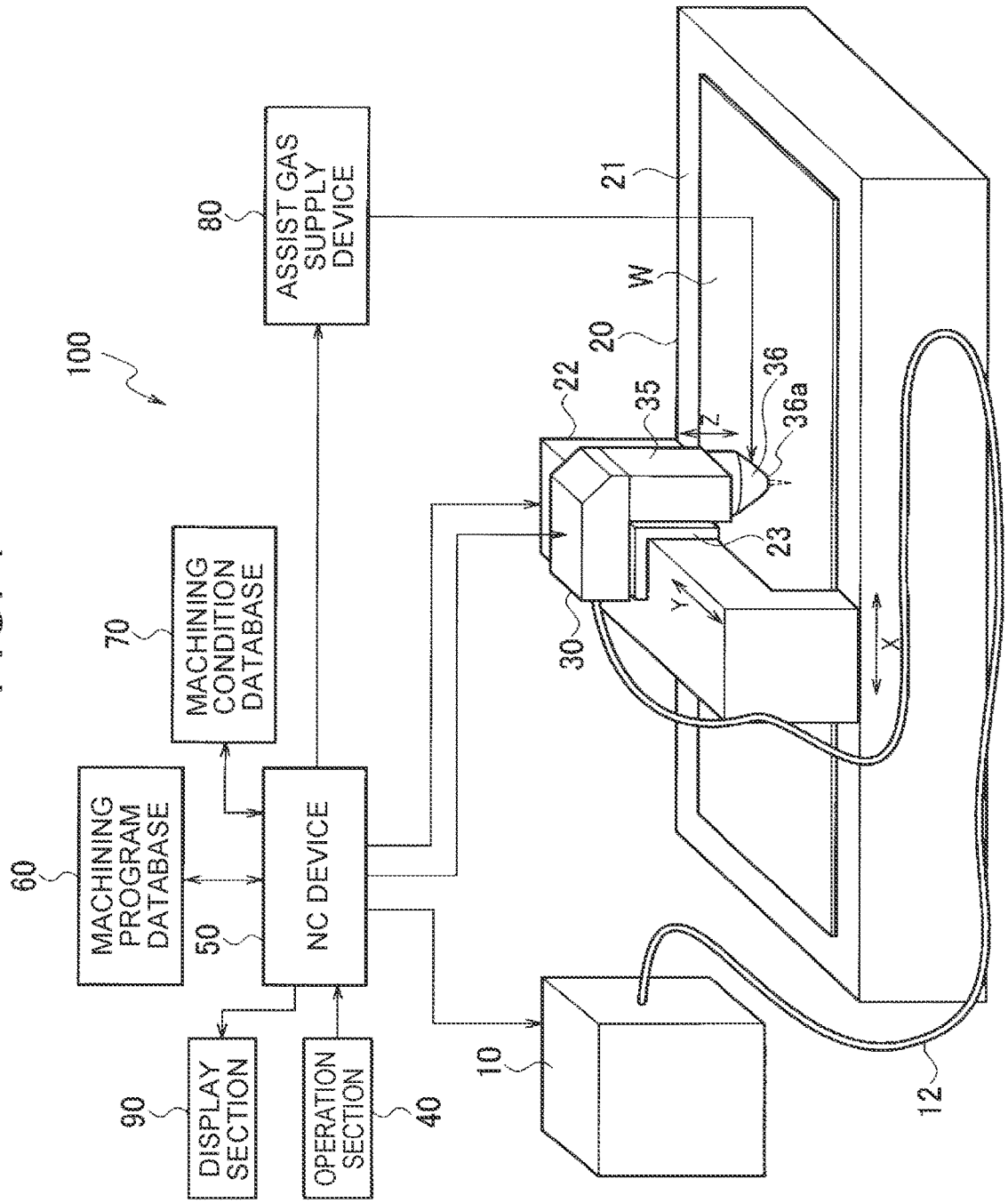
FIG. 1 is a diagram illustrating an entire configuration example of a laser machining apparatus of one or more embodiments.

Hereinafter, a laser machining apparatus and a laser machining method of one or more embodiments will be described with reference to the accompanying drawings. In FIG. 1, a laser machining apparatus 100 includes a laser oscillator 10 that generates and emits a laser beam, a laser machining unit 20, and a process fiber 12 that transmits the laser beam emitted by the laser oscillator 10 to the laser machining unit 20.

Further, laser machining apparatus 100 includes an operation section 40, an NC device 50, a machining program database 60, a machining condition database 70, an assist gas supply device 80, and a display section 90. The NC device 50 example of a control device that controls respective parts of the laser machining apparatus 100.

As the laser oscillator 10, a laser oscillator that amplifies an excitation beam emitted from a laser diode to emit a laser beam of a predetermined wavelength, or a laser oscillator that directly uses a laser beam emitted by a laser diode is preferable. The laser oscillator 10 is, for example, a solid laser oscillator, a fiber laser oscillator, a disk laser oscillator, or a direct diode laser oscillator (DDL oscillator).

The laser oscillator 10 emits a laser beam in a band of 1 μm with a wavelength of 900 nm to 1100 nm. Taking a fiber laser oscillator and a DDL oscillator as examples, fiber laser oscillator emits a laser beam with a wavelength of 1060 nm to 1080 nm, and the DDL oscillator emits a laser beam with a wavelength of 910 nm to 950 nm.

The laser machining unit 20 has a machining table 21 where a sheet metal t to be machined is placed, a gate-type X-axis carriage 22, a Y-axis carriage 23, a collimator unit 30 fixed to the Y-axis carriage 23, and a machining head 35. The X-axis carriage 22 is configured to be movable in an X-axis direction on the machining table 21. The Y-axis carriage 23 is configured to be movable in a Y-axis direction perpendicular to the X-axis on the X-axis carriage 22. The X-axis carriage 22 and the Y-axis carriage 23 function as a moving mechanism that moves the machining head 35 in the X-axis direction, the Y-axis direction, or an arbitrary composition direction of the X-axis and a Y-axis, along a surface of the sheet metal W.

Instead of moving the machining head 35 along the surface of the sheet metal W, a position of the machining head 35 may be fixed, and the sheet metal W may be configured to move. The laser machining apparatus 100 can include the moving mechanism that moves the machining head 35 relatively to the surface of the sheet metal W.

To the machining head 35, a nozzle 36 that has a circular opening 36a at a tip end portion, and emits a laser beam from the opening 36a is attached. The sheet metal W is irradiated with the laser beam emitted from the opening 36a of the nozzle 36. The assist gas supply device 80 supplies nitrogen, oxygen, mixed gas of nitrogen and oxygen, or air to the machining head 35 as assist gas. At a time of machining the sheet metal W, the assist gas is blown to the sheet metal W from the opening 36a. The assist gas discharges molten metal in a kerf width where the sheet metal W is melted.

Figure 2:
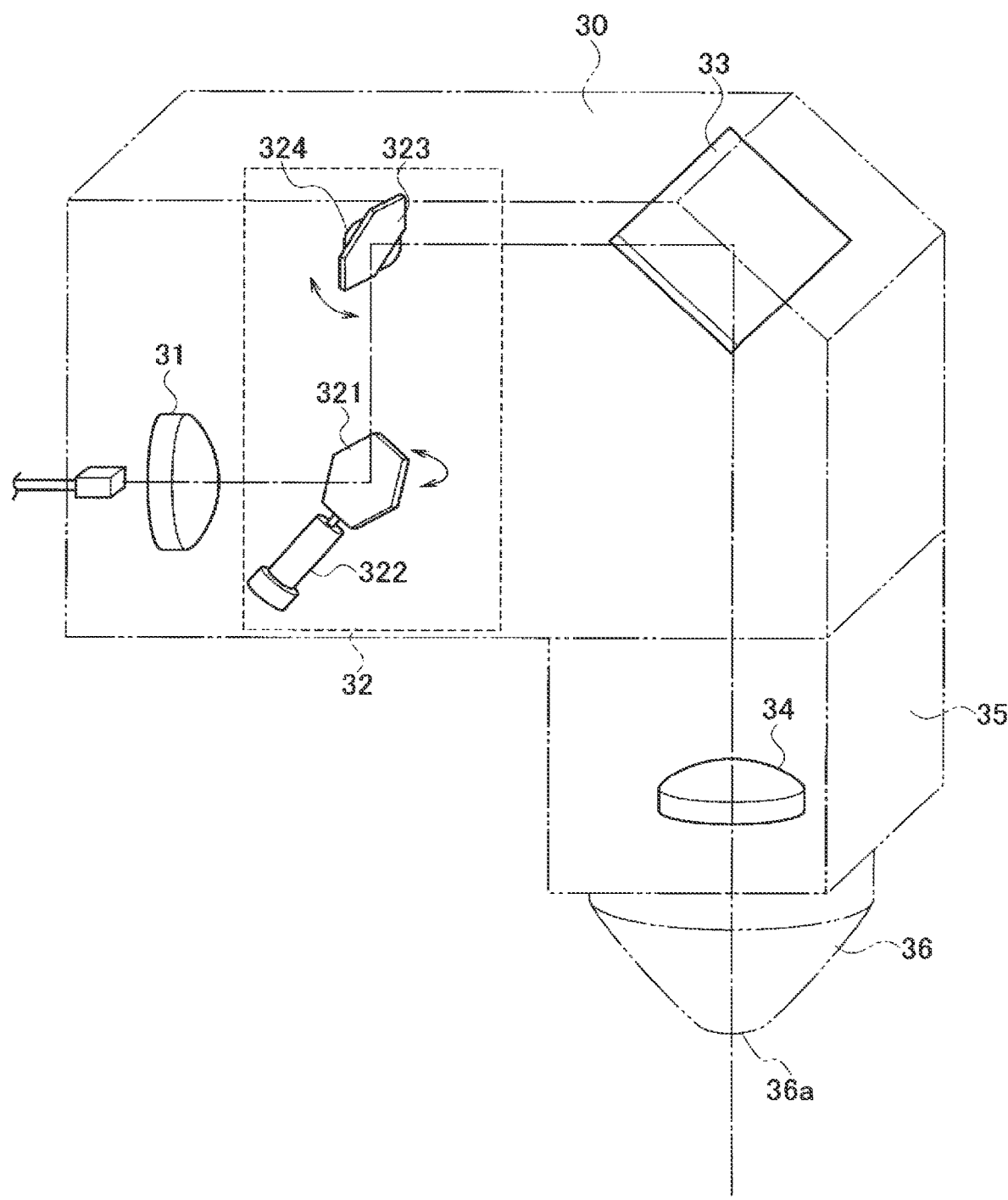
FIG. 2 is a perspective view illustrating detailed configuration examples of a collimator unit and a machining head in the laser machining apparatus of one or more embodiments.

As illustrated in FIG. 2, the collimator unit 30 includes a collimation lens 31 that converts a laser beam of a divergent beam emitted from the process fiber 12 into a parallel beam (collimated beam). Further, the collimator unit 30 includes a galvano scanner unit 32, and a bend mirror 33 that reflects a laser beam emitted from the galvano scanner unit 32 toward a lower part in a Z-axis direction perpendicular to the X-axis and the Y-axis. The machining head. 35 includes a focusing lens 34 that focuses the laser beam reflected by the bend mirror 33, and irradiates the sheet metal W.

In order to adjust a focus position of the laser beam, the focusing lens 34 is configured to be movable in a direction to approach the sheet metal W and a direction to separate from the sheet metal W by a drive section and a moving mechanism not illustrated.

The laser machining apparatus 100 is centered so that the laser beam emitted from the opening 36a of the nozzle 36 is located at a center of the opening 36a. In a regular state, the laser beam is emitted from the center of the opening 36a. The galvano scanner unit 32 functions as a beam vibrating mechanism that vibrates the laser beam that advances in the machining head 35 and is emitted from the opening 36a, in the opening 36a. How the galvano scanner unit 32 vibrates the laser beam will be described later.

The galvano scanner unit 32 has a scanning mirror that reflects the laser beam emitted from the collimation lens 31, and a drive section 322 that rotates the scanning mirror 321 to a predetermined angle. Further, the galvano scanner unit 32 has a scanning mirror 323 that reflects the laser beam emitted from the scanning mirror 321, and a drive section 324 that rotates the scanning mirror 323 to a predetermined angle.

The drive sections 322 and 324 can reciprocally vibrate the scanning mirrors 321 and 323 within a predetermined angle range respectively based on control by the NC device 50. By reciprocally vibrating either one or both of the scanning mirror 321 and the scanning mirror 323, the galvano scanner unit 32 can vibrate the laser beam with which the sheet metal w is irradiated.

The galvano scanner unit 32 is one example of the beam vibrating mechanism, and the beam vibrating mechanism is not limited to the galvano scanner unit 32 having a pair of scanning mirrors.

Figure 3:
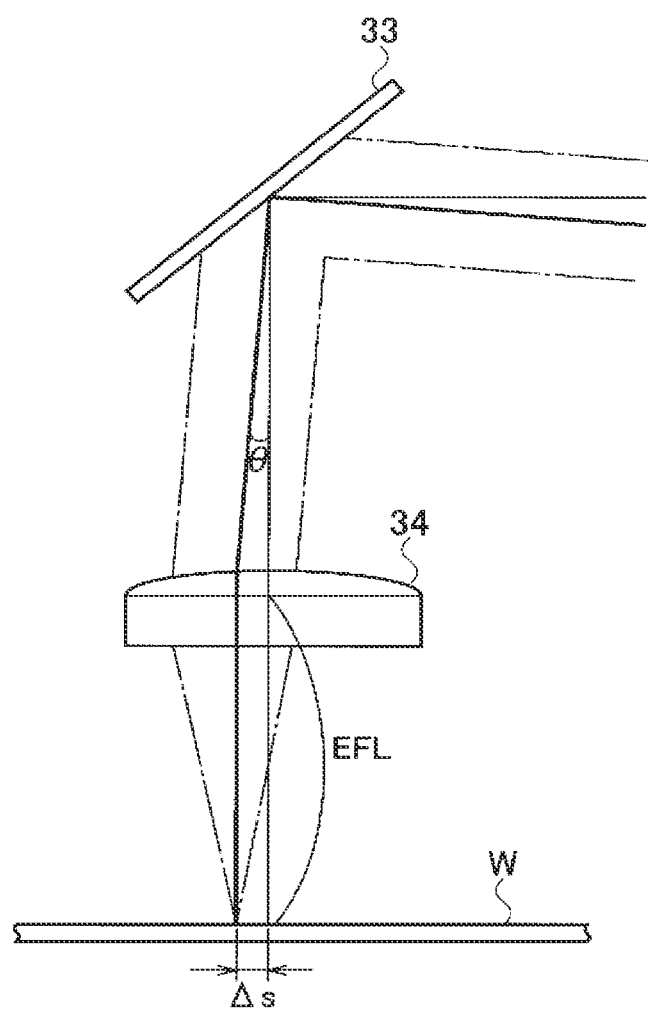
FIG. 3 is a diagram for explaining a displacement of an irradiation position of a laser beam to a sheet metal by a beam vibrating mechanism.

FIG. 3 illustrates a state where either one or both of the scanning mirror 321 and the scanning mirror 323 is or are tilted, and a position of the laser beam with which the sheet metal N is irradiated is displaced. In FIG. 3, a fine solid line that is bent by the bend mirror 33 and passes through the focusing lens 34 shows an optical axis of the laser beam in the regular state of the laser machining apparatus 100.

Note that, in detail, an angle or the optical axis of the laser beam that is incident on the bend mirror 33 changes by an operation of the galvano scanner unit 32 located in front of the bend mirror 33, and the optical axis deviates from a center of the bend mirror 33. In FIG. 3, for simplification, incident positions of the laser beams onto the bend mirror 33 are assumed to be same positions before and after the operation of the galvano scanner unit 32.

The optical axis of the laser beam is assumed to be displaced from the position shown by the fine solid line to a position shown by a thick solid line by the action by the galvano scanner unit 32. When the laser beam reflected by the bend mirror 33 is assumed to incline at an angle θ, an radiation position of the laser beam onto the sheet metal W is displaced by a distance Δs. When a focal length of the focusing lens 34 is EFL (Effective Focal Length), the distance Δs is calculated by EFL×sinθ.

If the galvano scanner unit 32 inclines the laser beam at the angle θ in an opposite direction to a direction shown in FIG. 3, the irradiation position of the laser beam onto the sheet metal W can be displaced by the distance Δs in an opposite direction to the direction shown in FIG. 3. The distance Δs is a distance less than a radius of the opening 36a, and is preferably a distance less than or equal to a maximum distance when the maximum distance is a distance obtained by subtracting a predetermined margin from the radius of the opening 36a.

The NC device 50 can vibrate the laser beam in a predetermined direction within a surface of the sheet metal W by controlling the drive sections 322 and 324 of the galvano scanner unit 32. By vibrating the laser beam, it is possible to vibrate a beam spot formed on the surface of the sheet metal W.

The laser machining apparatus 100 configured as above cuts the sheet metal W by the laser beam emitted by the laser oscillator 10 to produce a product having a predetermined shape. The laser machining apparatus 100 locates a focus of the laser beam at any appropriate position on a top surface of the sheet metal W, or within a thickness of the sheet metal W above the top surface by a predetermined distance or below the top surface by a predetermined distance, and cuts the sheet metal while vibrating the laser beam in a predetermined vibration pattern.

A machining program for cutting the sheet metal N is stored in the machining program database 60. The NC device 50 reads the machining program from the machining program database 60, and selects any machining condition file among a plurality of machining condition files stored in the machining condition database 70. The NC device 50 controls the laser machining apparatus 100 to cut the sheet metal W based on the read machining program and machining conditions set in the selected machining condition file.

As described later, the laser machining apparatus 100 is configured to be able to set the vibration pattern of the laser beam correspondingly to each of machining conditions set in the machining condition files. The display section 90 displays setting items at a time of setting the vibration pattern of the laser beam correspondingly to each of the machining conditions based on control by the NC device 50.

With reference to FIG. 4A to FIG. 4E, examples of the vibration pattern in which NC device 50 vibrates the laser beam by the galvano scanner unit 32 will be described. Assume that the cutting advancing direction of the sheet metal W is an x-direction, and a direction orthogonal to the x-direction within the surface of the sheet metal W is a y-direction. The vibration pattern is set in each of the machining conditions of the machining condition files stored in the machining condition database 70, and the NC device 50 controls the galvano scanner unit 32 to vibrate the laser beam in the vibration pattern set in the machining condition.

Figure 4A:
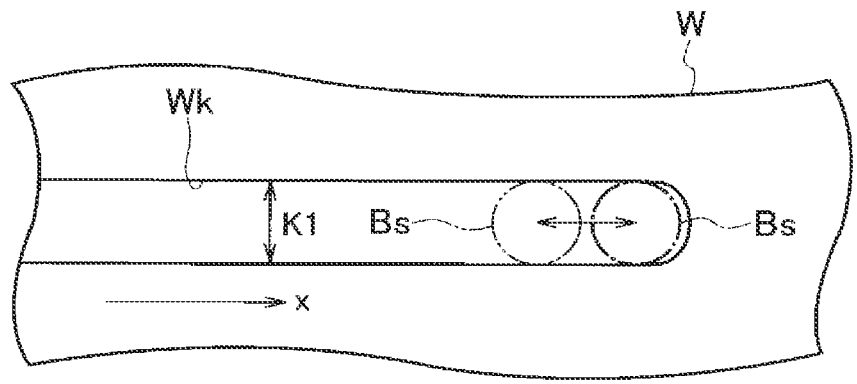
FIG. 4A is a diagram illustrating a parallel vibration pattern of the laser beam.

FIG. 4A to FIG. 4E illustrate vibration patterns in a state where the machining head 35 is not moved in the x-direction for easy understanding of the vibration patterns. FIG. 4A illustrates a vibration pattern for vibrating a beam spot Bs in the x-direction within a groove Wk formed by advancement of the beam spot Bs. The vibration pattern illustrated in FIG. 4A is referred to as a parallel vibration pattern. At this time, a kerf width K1 of the groove Wk is substantially a diameter of the beam spot Bs. When a frequency at which the beam spot Bs is vibrated in a parallel direction with the cutting advancing direction is Fx, and a frequency at which the beam spot Bs is vibrated in a direction orthogonal to the cutting advancing direction is Fy, the parallel vibration pattern is a vibration pattern in which Fx:Fy is 1:0.

Figure 4B:
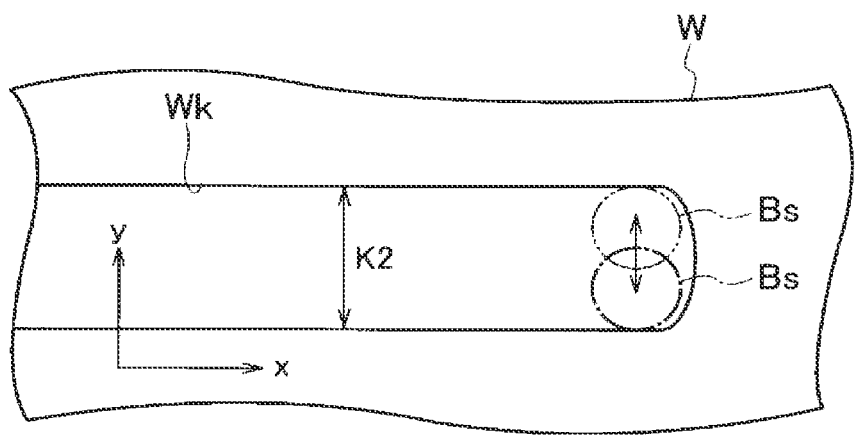
FIG. 4B is a diagram illustrating an orthogonal vibration pattern of the laser beam.
Figure 4C:
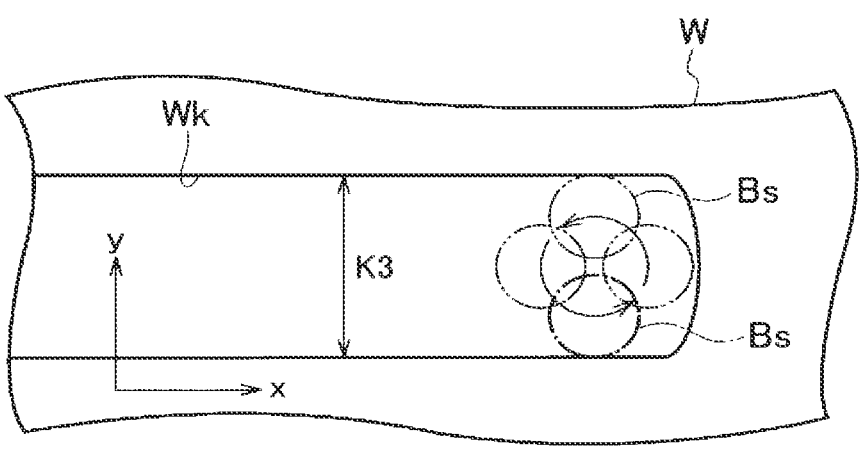
FIG. 4C is a diagram illustrating a circular vibration pattern of the laser beam.
Figure 4D:
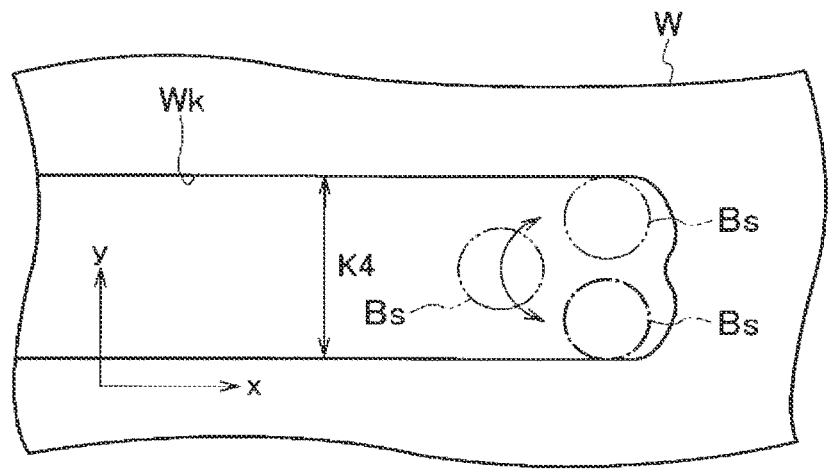
FIG. 4D is a diagram illustrating a C-shaped vibration pattern of the laser beam.
Figure 4E:
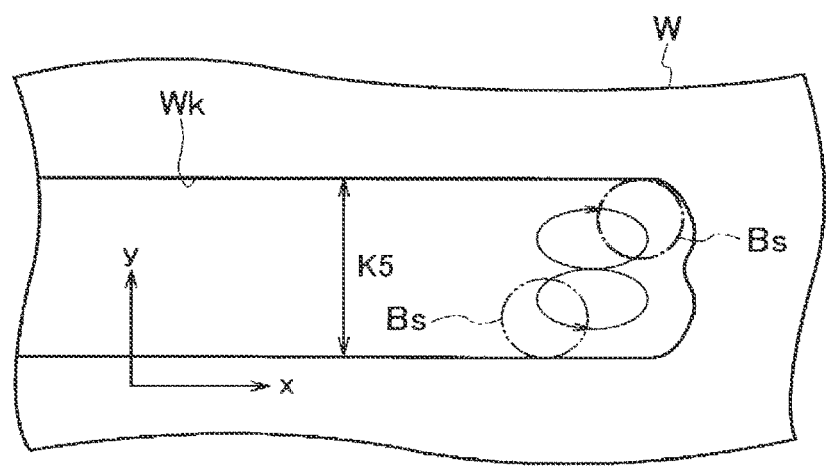
FIG. 4E is a diagram illustrating an 8-shaped vibration pattern of the laser beam.

FIG. 4E illustrates a vibration pattern in which the beam spot Bs is vibrated in the y-direction. By vibrating the beam spot Bs in the y-direction, the groove Wk has a kerf width K2 wider than the kerf width K1. The vibration pattern illustrated in FIG. 4B is referred to as an orthogonal vibration pattern. The orthogonal vibration pattern is a vibration pattern in which Fy is 0:1.

FIG. 4C illustrates a vibration pattern in which the beam spot Bs is vibrated so that the beam spot is draws a circle. By vibrating the beam spot Bs circularly, the groove Wk has a kerf width K3 that is wider than the kerf width K1. The vibration pattern illustrated in FIG. 4C is referred as a circular vibration pattern. The circular vibration pattern is a vibration pattern in which Fx:Fy is 1:1.

FIG. 4D illustrates a vibration pattern in which the beam spot Bs is vibrated so that the beam spot Bs draws C in the alphabet. By vibrating the beam spot Bs in a C-shape, the groove Wk has a width K4 that is wider than the kerf width K1. The vibration pattern illustrated in FIG. 4D is referred to as a C-shaped vibration pattern. The C-shaped vibration pattern is a vibration pattern in which Fx:Fy is 2:1 (=1/2). Further, Fy has a phase difference $1/2\mu(=90°)$ from Fx.

FIG. 4E illustrates a vibration pattern in which the beam spot Bs is vibrated so that the beam spot Bs draws the FIG. 8. By vibrating the beam spot Bs in a shape of 8, the groove Wk has a kerf width K5 that is wider than the kerf width K1. The vibration pattern illustrated in FIG. 4E is referred to as an 8-shaped vibration pattern. The 8-shaped vibration pattern is a vibration pattern in which Fx:Fy is 2:1.

Figure 5:
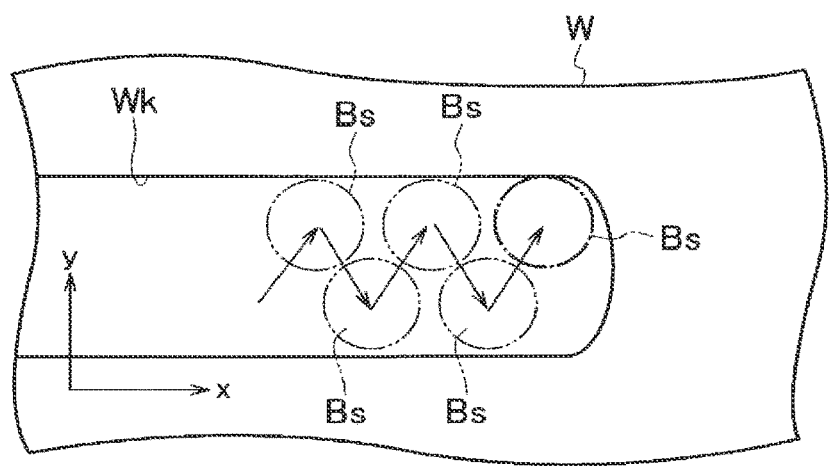
FIG. 5 is a diagram illustrating an actual vibration pattern at a time or using the orthogonal vibration pattern illustrated in FIG. 4B.

In reality, the laser beam vibrates while the machining head 35 moves in the cutting advancing direction, so that the vibration patterns are vibration patterns in which displacement in the cutting advancing direction (x-direction) is added to the vibration patterns illustrated in FIG. 4A to FIG. 4E. Taking the orthogonal vibration pattern illustrated in FIG. 4B as an example, the beam spot Bs vibrates in the y-direction while moving in the x-direction, and therefore, an actual orthogonal vibration pattern is a vibration pattern as illustrated in FIG. 5.

Figure 6:
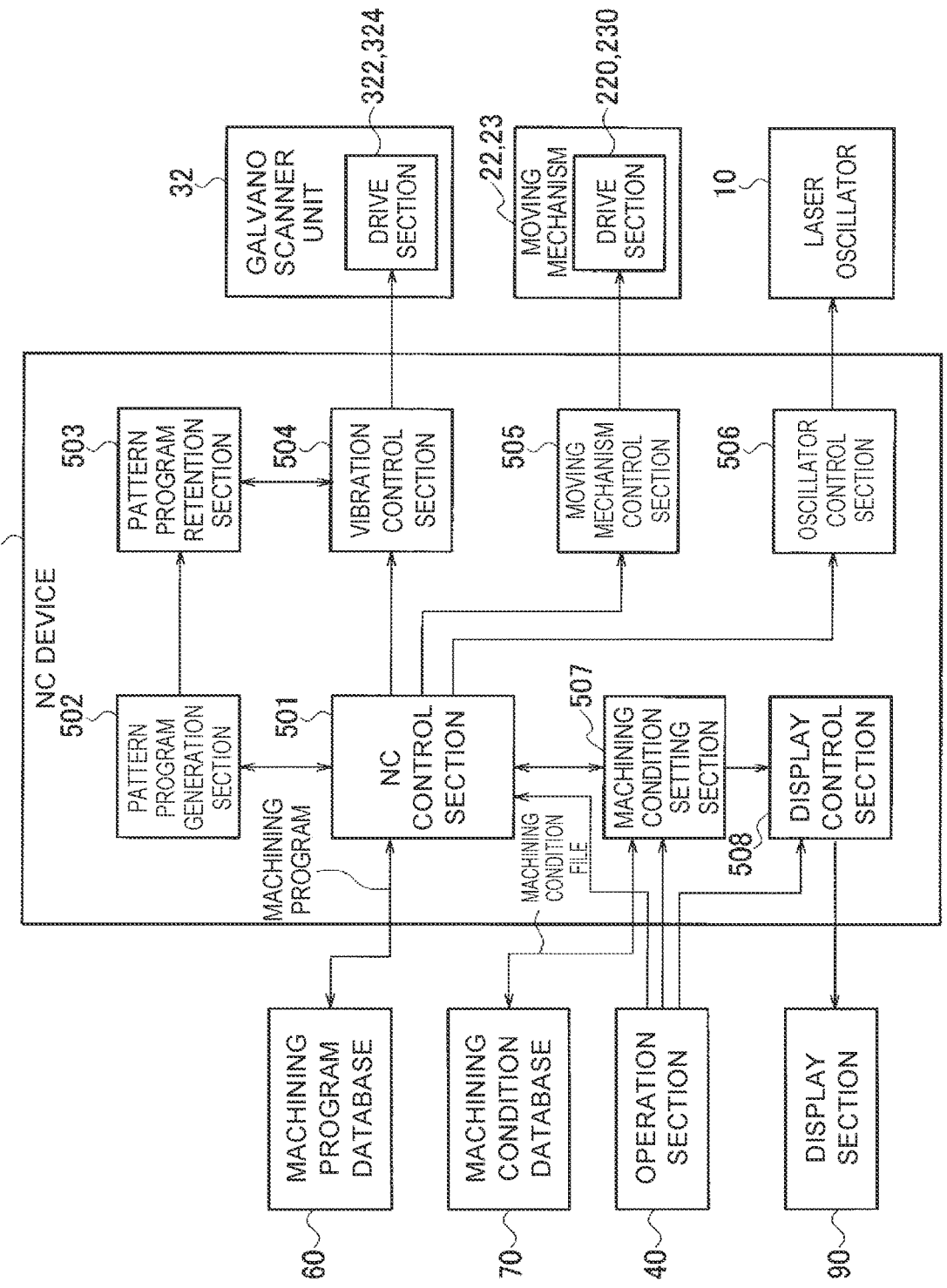
FIG. 6 is a block diagram illustrating a functional configuration example of an NC device included by the laser machining apparatus of one or more embodiments.

Next, with reference to FIG. 6 to FIG. 10, how an appropriate vibration pattern is set correspondingly to the processing condition of the sheet metal W will be described. As illustrated in FIG. 6, the NC device 50 has an NC control section 501, a pattern program generation section 502, a pattern program retention section 503, a vibration control section 504, a moving mechanism control section 505, an oscillator control section 506, a machining condition setting section 507, and a display control section 508, as a functional configuration.

When an instruction to read the machining program is made by the operation section 40, the NC control section 501 reads a machining program that is created in advance to cut, the sheet metal W, and is stored in the machining program database 60. The machining program is configured by a plurality of commands expressed by machine control codes as illustrated in FIG. 7 as an example.

Figure 7:
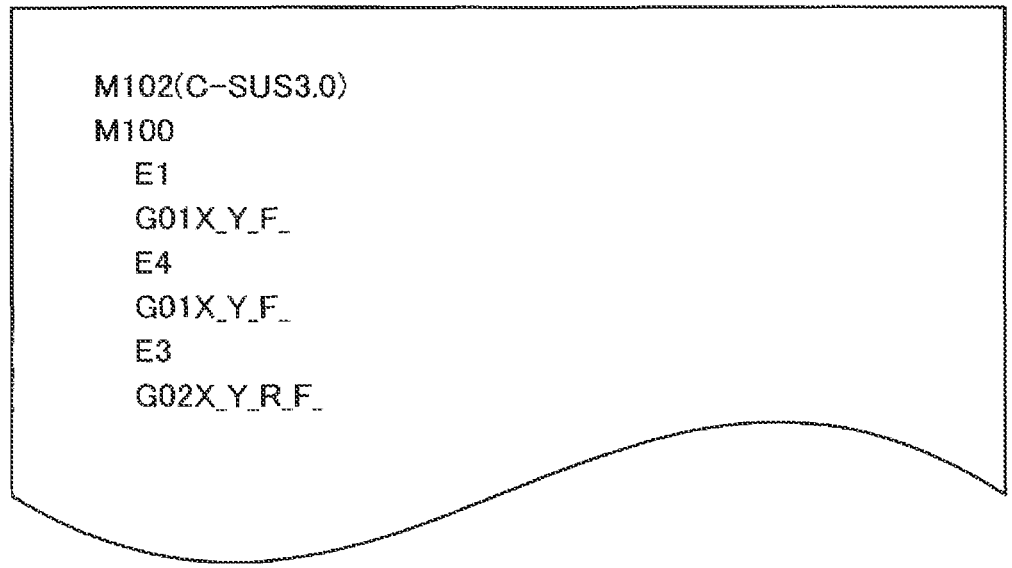
FIG. 7 is a diagram illustrating one example of a machining program.

In FIG. 7, M102 is a command to select a machining condition file, and here, instructs to select a machining condition file with a name of C-SUS3.0, as an example M100 indicates a command to execute laser machining. A number (E-number) assigned with F in the alphabet represents a machining condition number described later. A command starting with G01 represents a machining command of linear interpolation that moves the laser beam at a moving velocity F on a straight line connecting a start point and an end point specified by X and Y.

A command starting with G02 represents a machining command of circular-interpolation that moves the laser beam at the moving velocity F on a circular arc connecting the start point and the end point. Of a method for identifying a circular arc by specifying a radius of the circular arc, and a method for identifying a circular arc by specifying a center of the circular arc, the former method is shown here.

In the machining condition database 70, a machining condition file with a name of C-SUS3.0 illustrated in FIG. 8, and a plurality of other machining condition files are stored. The machining condition file illustrated in FIG. 8 shows a state where a parameter described later for determining the vibration pattern is not added. The parameter is an element for determining a specific way of vibration by the vibration pattern. First, an outline of the machining condition file in the state where the parameter for determining the vibration pattern is not added is as follows.

As illustrated in FIG. 8, the machining condition file includes information on a name of the laser oscillator 10, the material and thickness of the sheet metal W, a nozzle type that is a type of the nozzle 36, a nozzle diameter that is a diameter of the opening 36a, and the focal length of the focusing lens 34. These pieces of information indicate conditions that are commonly applied regardless of the machining condition with which machining condition number set in the machining condition file is selected. The machining condition file may include other pieces of information not illustrated in FIG. 8.

In the machining condition file, various conditions at a time of machining the sheet metal W are set in response to the plurality of machining condition numbers. The machining condition numbers correspond to numbers (E-numbers) to which E in the alphabet is assigned in the machining program illustrated in FIG. 7. In FIG. 8, a velocity indicates a machining velocity (velocity data) of the sheet metal W that is a moving velocity of the machining head 35. An output, a frequency and a duty respectively represent a laser output (laser power) of the laser oscillator 10, a frequency and a duty, at a time of pulse oscillation. A gas pressure and a gas type respectively represent a gas pressure and a gas type of the assist gas supplied by the assist gas supply device 80.

A nozzle gap represents a distance from a tip end of the nozzle 36 to the top surface of the sheet metal W. A tool radius compensation amount represents a distance by which the laser beam is displaced from an end portion when scanning the laser beam along the end portion of a product. The tool radius compensation amount is a distance corresponding to a radius of the beam spot Bs. A focus compensation amount represents a distance by which the focus of the laser beam is displaced upward or downward from a position (0.00) that is a reference. Other conditions not illustrated in FIG. 8 may be set correspondingly to the respective machining condition numbers.

As illustrated in FIG. 9, in the machining condition database 70, first parameters for determining respective vibration patterns are stored correspondingly to vibration pattern numbers for selecting the respective vibration patterns. The vibration pattern number is pattern selection information for selecting the vibration pattern of the laser beam. The first parameter is a parameter for determining a shape of each of the vibration patterns. Here, for easy understanding, vibration pattern names are shown correspondingly to the respective vibration pattern numbers, but the vibration pattern names do not have to be stored in the machining condition database 70.

In the machining condition database 70, a frequency ratio between a frequency for vibrating the laser beam in the x-direction and a frequency for vibrating the laser beam in the y-direction, and a phase difference between the vibration in the x-direction and vibration in the y-direction are set correspondingly to each of the vibration pattern numbers, as the first parameter.

When an operation of setting the parameters for determining the vibration pattern is performed by the operation section 40, the machining condition setting section 507 controls the display control section 508 to display a setting list as illustrated in FIG. 10 on the display section 90. As illustrated in FIG. 10, the setting list is a list for selecting the vibration pattern number correspondingly to each of the numbers, and setting a second parameter for determining the vibration pattern of each of the vibration pattern numbers for each of the vibration pattern numbers. The second parameter is a parameter for determining an amplitude and a frequency of each of the vibration patterns which has a shape determined by the first parameter.

In FIG. 10, Qx represents a set value for setting an amplitude in the x-direction, and Qy represents a set value for setting an amplitude in the y-direction. For example, in a machining condition of an E-number E2, a circular vibration pattern of an amplitude in the x-direction of 90 (µm), an amplitude in the v-direction of 90 (µm), and a frequency of 3000 (Hz) is set.

All kinds of information corresponding to the machining condition numbers of the machining condition file illustrated in FIG. 8 do not have to be displayed in the setting list. Only the E-numbers may be displayed in the setting list, and the amplitude pattern numbers and the second parameters may be associated with the E-numbers.

A setter or a serviceman of a manufacturer of the laser machining apparatus 100 can set the vibration pattern number and the second parameter by displaying the setting list illustrated in FIG. 10 on the display section 90 by operating the operation section 40. It is preferable that a user of the laser machining apparatus 100 cannot perform an operation of displaying set items encircled by a thick solid line on the display section 90 and cannot see the items encircled by the thick solid line. It is preferable that the list of the machining condition except for the set items encircled by the thick solid line is set to be displayed when the user operates the operation section 40 to display the list of the F-number on the display section 90.

The machining condition file to which the vibration pattern number and the second parameter for determining the vibration pattern are added as above is written to the machining condition database 70. The machining condition database 70 is an example of a storage section that stores the machining condition file to which the vibration pattern number and the second parameter are added. The machining condition file may be stored in another storage section connected to the NC device 50.

When the machining program illustrated in FIG. 7 is supplied to the NC control section 501, the information in which the first parameter is associated with each of the vibration pattern numbers illustrated in FIG. 9, and the machining condition file with the name C-SUS3.0 are read from the machining condition database 70. The vibration pattern number and the second parameter are added to the machining condition file. The information and machining condition file illustrated in FIG. 9 are supplied to the NC control section 501 from the machining condition setting section 507.

The pattern program generation section 502 generates a pattern program for vibrating the laser beam the vibration patterns corresponding to all the E-numbers included in the machining program read by the NC control section 501. The pattern program is a control code for operating the galvano scanner unit 32, and is a program in which a command (process) to a computer is described. The pattern program generation section 502 can generate the pattern program based on the first and second parameters supplied to the NC control section 501. The pattern program generated by pattern program generation section 502 is supplied to and retained in the pattern program retention section 503.

After being instructed to execute laser machining by the machining program, the NC control section 501 supplies the vibration pattern number to the vibration control section 504 for each of the F-numbers. The NC control section 501 extracts information the focal length of the focusing lens 34 necessary to determine the vibration pattern out of the information included in the machining condition file to supply the information on the focal length of the focusing lens 34 to the vibration control section 504. The NC control section 501 preferably extracts the information on the focus compensation amount in addition to the information on the focal length and supplies the information on the focus compensation amount to the vibration control section 504. Though not illustrated in FIG. 6, in order to adjust the focus position of the laser beam, the information on the focus compensation amount is also used to control the drive section of the focusing lens 34. Further, the NC control section 501 supplies the vector information for moving the laser beam to the vibration control section 504, based on the machining command that starts with G01, G02 or the like and moves the laser beam.

The vibration control section 504 reads the pattern program corresponding to the vibration pattern number from the pattern program retention section 503. The vibration control section 504 controls the drive sections 322 and 324 of the galvano scanner unit 32 to vibrate the laser beam in the selected vibration pattern and the set information, the focal length and the focus compensation amount of the focusing lens 34.

By the machining program or the machining condition file, or manual setting by the operation section 40, offset value showing a distance by which the laser beam emitted from the opening 36a of the nozzle 36 is offset to at least one of the x-direction and the direction from the center of the opening 36a may be set. In this case, the NC control section 501 supplies offset values in the x-direction and the y-direction to the vibration control section 504.

A moving mechanism formed by the X-axis carriage 22 and the Y-axis carriage 23 (hereinafter, the moving mechanisms 22 and 23) has drive sections 220 and 230 that respectively drive the moving mechanisms 22 and 23. The moving mechanism control section 505 controls the drive sections 220 and 230 based on the machining command that moves the laser beam, and moves the machining head 35. The moving mechanism control section 505 controls the drive sections 220 and 230 every 1 ms, for example, and moves the machining head 35. Consequently, the cutting advancing direction in which the laser beam cuts the sheet metal W is controlled with a control period of 1 ms (first control period).

Figure 11:
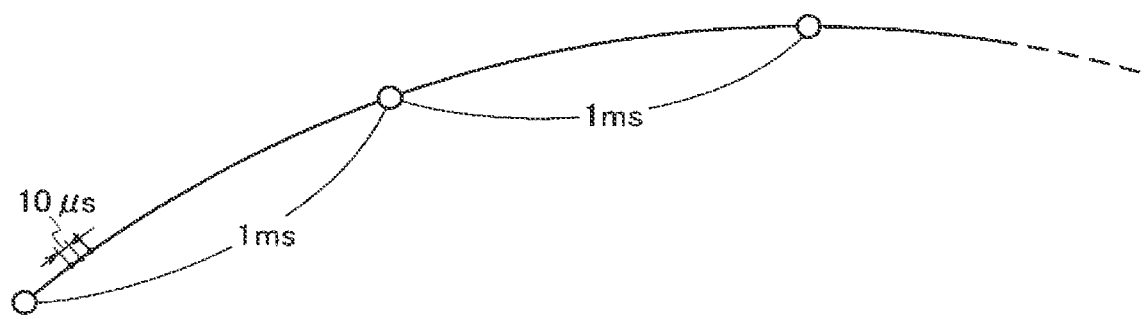
FIG. 11 is a diagram illustrating a relationship between a control period at a time of a moving mechanism moving a machining head, and a control period at a time of the beam vibrating mechanism vibrating the laser beam.

The vibration control section 504 can control the drive sections 322 and 324 with a control period shorter than 1 ms, and control the vibration of the laser beam with a control period shorter than 1 ms. FIG. 11 conceptually illustrates a state where the moving mechanism control section 505 moves the machining head 35 (laser beam) in a circular-arc shape with a control period of 1 ms, based on a machining command starting with G02 (or G03). The vibration control section 504 controls the vibration of the laser beam with a control period (second control period) of 10 μs obtained by multiplying 1/100 by 1 ms, for example. In this way, it is possible to vibrate the laser beam with high precision in the pattern set in each of the vibration patterns every 10 μs.

Note that due to the convenience of the NC device 50, and motor amplifiers or motors of the moving mechanisms 22 and 23, the periods in the first control period and the second control period can be arbitrarily set. Further, in order to further subdivide the first control period, it is also possible to set another control period between the first control period and the second control period.

Figure 12:
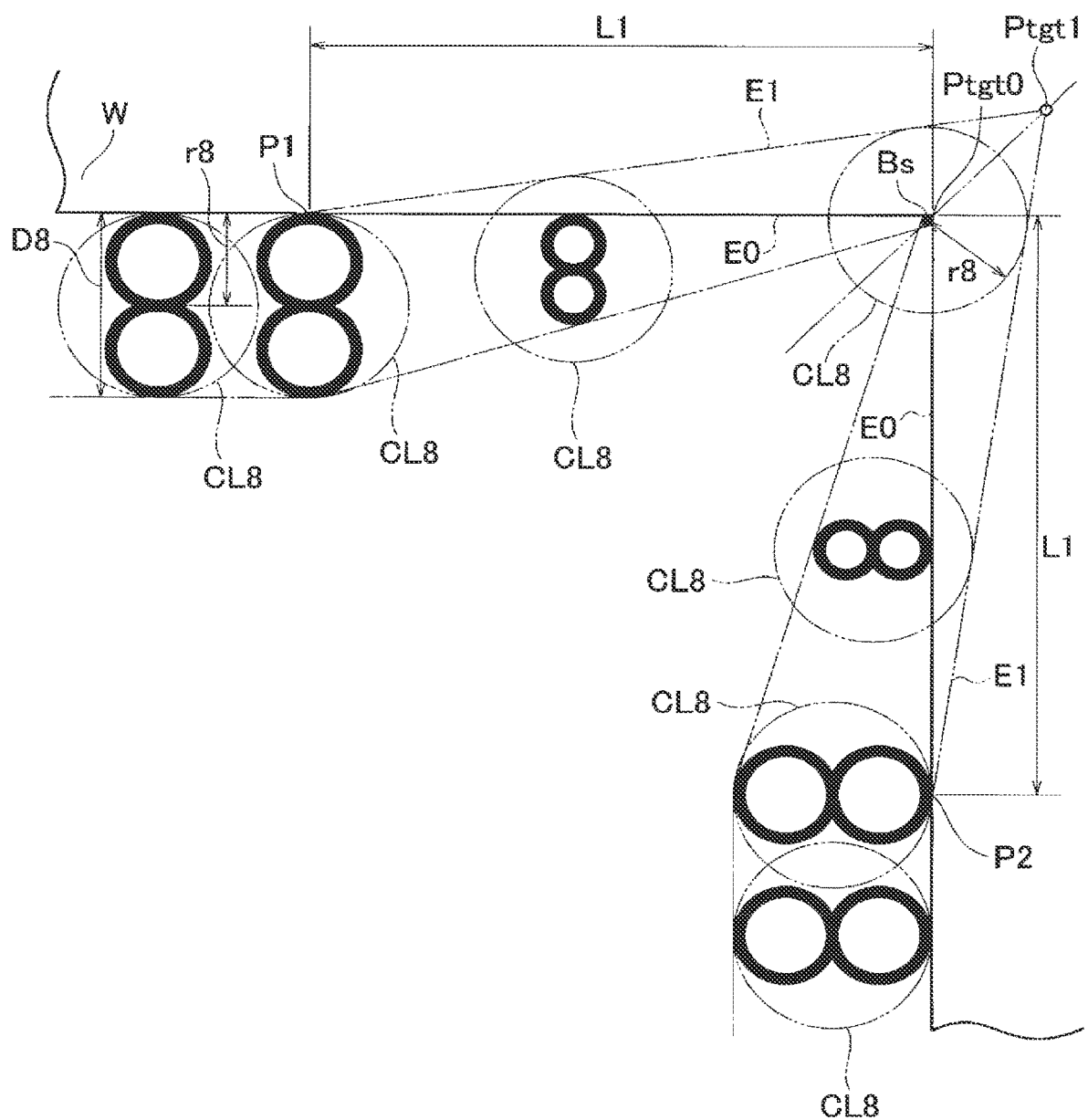
FIG. 12 illustrates an operation at a time of the laser machining apparatus according to one or more embodiments cutting an outside of a corner portion at 270 degrees of a product, and is a diagram illustrating a laser machining method of one or more embodiments.
Figure 13:
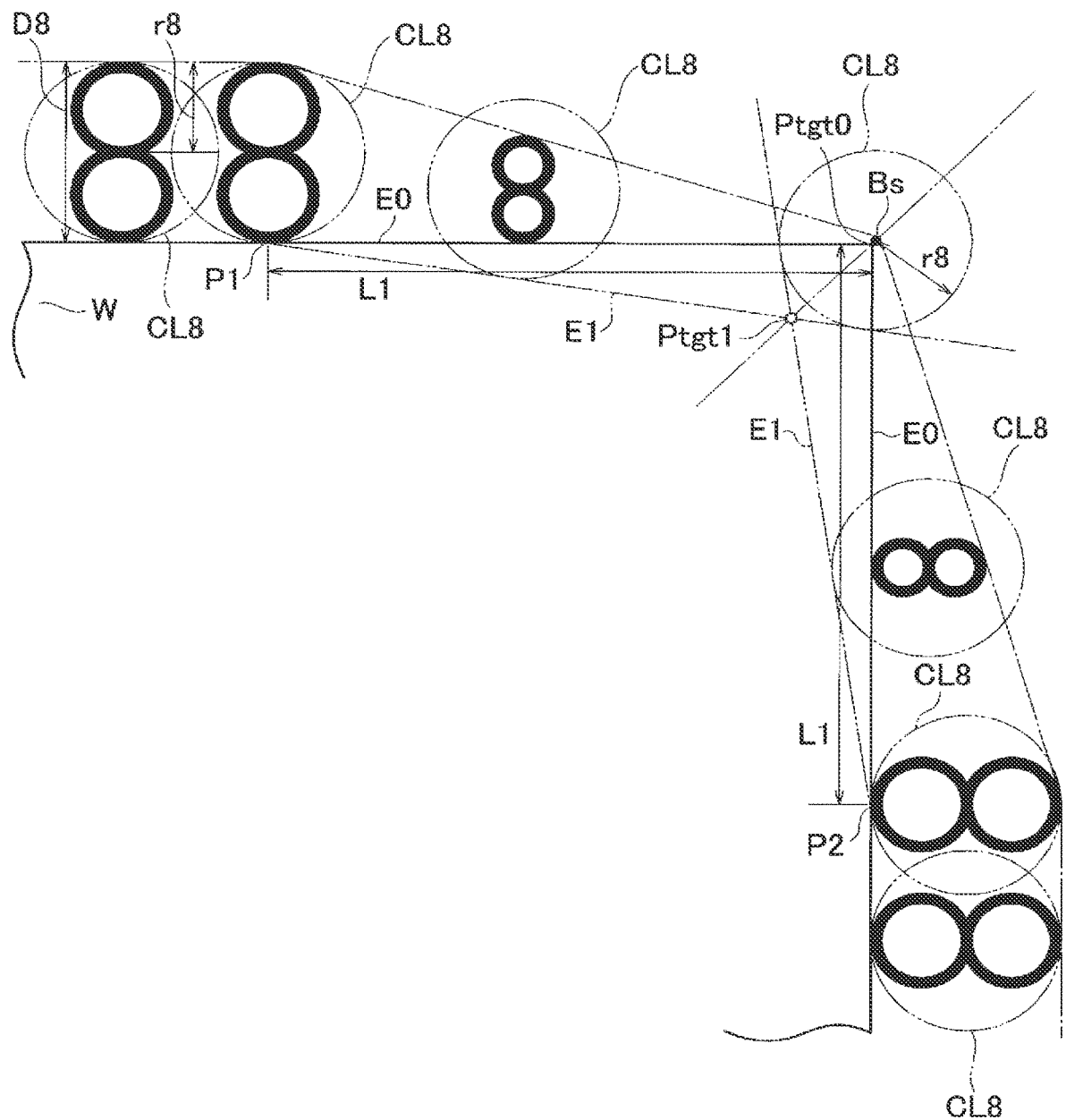
FIG. 13 illustrates an operation at a time of the laser machining apparatus of one or more embodiments cutting an outside of a corner portion at 90 degrees of a product, and is a diagram illustrating the laser machining method of one or more embodiments.

Next, with reference to FIG. 12 and FIG. 13, an operation for cutting a corner portion of a product with high precision when the laser machining apparatus 100 vibrates the laser beam in a predetermined vibration pattern and cuts the sheet metal will be described. FIG. 12 illustrates an operation in a case where a product has a corner portion at 270 degrees, and the laser machining apparatus 100 cuts the sheet metal W to cut a corner portion at 90 degrees outside of the product. FIG. 13 illustrates an operation in a case where a product has a corner portion at 90 degrees, and the laser machining apparatus 100 cuts the sheet metal W to cut a corner portion at 270 degrees outside of the product.

FIG. 12 and FIG. 13 each conceptually illustrates a locus of the laser beam when the vibration pattern is the 8-shaped vibration pattern illustrated in FIG. 4E as an example. As described above, an actual vibration pattern is a vibration pattern obtained by adding a displacement in the cutting advancing direction of the machining head 35 to the vibration pattern illustrated in FIG. 4E. FIG. 12 and FIG. 13 illustrate the vibration patterns to which a displacement in the cutting advancing direction of the machining head 35 is not added, for easy understanding of change in amplitude. Further, for easy understanding of change in amplitude, loci of the laser beam in a plurality of positions where the laser beam vibrates in the 8-shaped vibration pattern are illustrated.

The machining program includes a machining command to move the machining head 35 from a left side to a target position Ptgt0 and move the machining head 35 from the target position Ptgt0 to a lower side, in order to cut an end portion E0 of the product illustrated in FIG. 12. The moving mechanism control section 505 is provided with a tool radius compensation amount (radius of a beam spot Bs), and the amplitude Qx in the x-direction and the amplitude Qy in the y-direction by the NC control section 501. Accordingly, the moving mechanism control section 505 recognizes a tool radius of the laser beam by the 8-shaped vibration pattern is a diameter D8 of a circle CL8 shown by a two-dot chain line. The circle CL8 is a circle that circumscribes a locus of the laser beam by the 8-shaped vibration pattern. The tool radius compensation amount at this time is a radius r8 of the circle CL8.

Assume that in FIG. 12, the moving mechanism control section 505 moves the machining head 35 toward the target position Ptgt0 based on an exact machining command described in the machining program. Thereupon, the laser beam that vibrates in the 8-shaped vibration pattern in the circle CL8 directly moves to a vicinity of the target position Ptgt0 along the end portion 50. The laser beam that vibrates in the 8-shaped vibration pattern turns in the vicinity of the target position Ptgt0, and moves downward along the end portion 50. In this case, the corner portion of the product is not cut with high precision.

Therefore, the moving mechanism control section 505 controls the moving mechanisms 22 and 23 to move the machining head 35 as follows, and in addition, the vibration control section 504 controls the drive sections 322 and 324 to control the vibration pattern as follows.

When cutting the end portion E0 except for a periphery of the target position. Ptgt0 that is the corner portion of the product, the moving mechanism control section 505 controls the moving mechanisms 22 and 23 to move the laser beam by the 8-shaped vibration pattern along the end portion E0 by displacing the laser beam by a distance of the radius r8 of the tool radius compensation amount. The moving mechanism control section 505 replaces the target position Ptgt0 of the machining head 35 with a compensation target position Ptgt1 at a time point when a present position on the end portion EQ becomes a position P1 (first position) before the target position Ptgt0 by a predetermined distance L1. The compensation target position Ptgt1 is located inside of the product.

The moving mechanism control section 505 moves the machining head 35 to the target position by the command of the machining program after setting a position P2 (second position) on the end portion E0 that is ahead of the original target position Ptgt0 by the distance L1 as a via position, when moving the machining head 35 downward from the compensation target position Ptgt1.

The beam spot Bs of the laser beam in a non-vibrate state is located at a corner portion on a side that is cut and outside the product. The circle CL8 is also a circle with a diameter D8 in a state located at the corner portion of the product. The compensation target position Ptgt1 an intersection point of a straight line contacting both a circle located at the position P1 before the target position Ptgt0 by the distance L1 and a circle located at the corner portion, and a straight line contacting both a circle located at the position P2 which is ahead of the target position Ptgt0 downward by the distance L1 and the circle located the corner portion. The compensation target position Ptgt1 is located at a position where a line segment that bisects an angle of the corner portion of the product passes.

The moving mechanism control section 505 replaces the target position Ptgt0 with the compensation target position Ptgt1, whereby the end port E0 of the product virtually becomes a line, segment E1 in a range from the position P1 to the position 22.

The vibration control section 504 vibrates the laser beam in the vibration pattern with the amplitudes Qx and Qy until the machining head 35 reaches the position P1. The vibration control section 504 controls the drive sections 322 and 324 to progressively reduce the amplitude of the vibration pattern in synchronism with the moving mechanism control section 505 moving the machining head 35 from the position P1 to the compensation target position Ptgt1. The vibration control section 504 controls the drive sections 322 and 324 to stop vibration at a time point when the laser beam reaches the original target position Ptgt0 at the latest. In other words, the laser beam can stop vibrating at least at a time point when the laser beam is located at the corner portion.

The vibration control section 504 may stop vibration at a time point when the laser beam approaches the original target position Ptgt0, and cannot be vibrated in the 8-shaped vibration pattern.

Further, the vibration control section 504 controls the drive sections 322 and 324 to progressively increase the amplitude of the vibration pattern in synchronism with the moving mechanism control section 505 moving the machining head 35 from the compensation target position Ptgt1 to the position P2. When and after the machining head 35 passes through the position P2, the vibration control section 504 vibrates the laser beam in the vibration pattern with the amplitudes Qx and Qy.

In FIG. 12, the compensation target position Ptgt1 and the virtual line segment E1 are set to move the locus of the laser beam by the vibration pattern in which the amplitude is progressively reduced from the position P1 to the corner portion (target position Ptgt0), and the vibration pattern in which the amplitude is progressively increased from the corner portion to the position P2, along the end portion E0 of the product.

It is possible to cut the corner portion of the product with high precision if the NO device 50 controls the target position to which the machining head 35 is moved and the amplitude of the vibration pattern as above when the laser machining apparatus 100 cuts the corner portion of the product illustrated in FIG. 12. In other words, the laser machining apparatus 100 can an inner periphery of the product by freely changing the amplitude of the vibration pattern without changing the tool radius compensation amount during interpolation machining.

As illustrated in FIG. 13, a similar operation to the operation in FIG. 12 is also executed when a product has a corner portion at 90 degrees and the laser machining apparatus 100 cuts the corner portion at 270 degrees outside of the product. In FIG. 13, the moving mechanism control section 505 replaces a target position Ptgt0 of the machining head 35 with a compensation target position Ptgt1 at a time point when a present position on an end portion E0 becomes a position P1 before the target position Ptgt0 by a distance L1. The compensation target position Ptgt1 is located inside of the product.

The moving mechanism control section 505 moves the machining head 35 to the target position by the command of the machining program after setting a position P2 on the end portion E0 that is ahead of the original, target position Ptgt0 by the distance L1 as a via position, when moving the machining head 35 downward from the compensation target position Ptgt1.

The beam spot Bs of the laser beam in a non-vibrated state is located at a corner portion on a side to be cut outside of the product. A circle CL8 is also a circle with a diameter D8 in a state located at the corner portion of the product. The compensation target position Ptgt1 is an intersection point of a straight line contacting both a circle CL8 located at the position P1 before the target position Ptgt0 by the distance L1 and a circle CL8 located at the corner portion, and a straight line contacting both a circle CL8 located at the position P2 which is ahead of the target position Ptgt0 downward by the distance L1 and the circle CL8 located at the corner portion. The compensation target position Ptgt1 is located at a position where a line segment that bisects an angle of the corner portion of the product passes.

The moving mechanism control section 505 replaces the target position Ptgt0 with the compensation target position Ptgt1 whereby the end portion E0 of the product virtually becomes a line segment E1 in a range from the position P1 to the position P2.

The vibration control section 504 vibrates the laser beam in the vibration pattern with the amplitudes Qx and Qy until the machining head 35 reaches the position P1. The vibration control section 504 controls the drive sections 322 and 324 to progressively reduce the amplitude of the vibration pattern in synchronism with the moving mechanism control section 505 moving the machining head 35 from the position P1 to the compensation target position Ptgt1. The v control section 504 controls the drive sections 322 and 324 to stop vibration at a time point when the laser beam reaches the original target position Ptgt0 at the latest. In other words, the laser beam can stop vibrating at least at a time point when the laser beam is located at the corner portion.

The vibration control section 504 may stop vibration at a time point when the laser beam approaches the original target position Ptgt0 and cannot be vibrated in the 8-shaped vibration pattern.

Further, the vibration control section 504 controls the drive sections 322 and 324 to progressively increase the amplitude of the vibration pattern, in synchronism with the moving mechanism control section 505 moving the machining head 35 from the compensation target position Ptgt1 to the position P2. When and after the machining head 35 passes through the position P2, the vibration control section 504 vibrates the laser beam in the vibration pattern with the amplitudes Qx and Qy.

In FIG. 13, the compensation target position Ptgt1 and the virtual line segment E1 are set to move the locus of the laser beam by the vibration pattern in which the amplitude is progressively reduced from the position P1 to the corner portion, and the vibration pattern in which the amplitude is progressively increased from the corner portion to the position P2, along the end portion E0 of the product.

It is possible to cut the corner portion of the product with high precision if the NC device 50 controls the target position to which the machining head 35 is moved and the amplitude of the vibration pattern as above when the laser machining apparatus 100 cuts the corner portion of the product illustrated in FIG. 13. In other words, the laser machining apparatus 100 can cut an outer periphery of the product by freely changing the amplitude of the vibration pattern without changing the tool radius compensation amount during interpolation machining.

In each of FIG. 12 and FIG. 13, the case where the angle on the side to be cut of the sheet metal W is 90 degrees, or the angle of the corner portion of the product is 90 degrees is taken as an example, but the same applies to a case where these angles are acute angles or obtuse angles. Further, the vibration. pattern. is not limited to the 8-shaped vibration pattern, and the same applies to the vibration patterns other than the 8-shaped vibration pattern illustrated in FIG. 4A to FIG. 4D.

The present invention is not limited to the one or more embodiments described above, and can be variously modified in the range without departing from the summary of the present invention. In the one or more embodiments, the parameters that determine the way of vibration by the vibration pattern are divided into the first parameter and the second parameter, but the way of setting the parameters is arbitrary as long as the specific way of vibration of each of the vibration patterns can be determined. The functional configuration in the NC device 50 illustrated in FIG. 6 may be realized by the central processing unit in the NC device 50 executing a computer program stored in a non-transitory storage medium.

The disclosure of the present application relates to the subject described in Japanese Patent application No. 2018-198451 filed on Oct. 22, 2018, the entire contents of which are incorporated herein by reference.

The invention claimed is:

1. A laser machining apparatus, comprising:
   a moving mechanism configured to relatively move a machining head emitting a laser beam, with respect to a sheet metal along a surface of the sheet metal;
   a beam vibrating mechanism configured to vibrate the laser beam for irradiation on the sheet metal in a predetermined vibration pattern, while the machining head is relatively moved by the moving mechanism;
   a vibration control section configured to control the beam vibrating mechanism to progressively reduce an amplitude of the vibration pattern from a first position to a corner portion when the machining head moves toward the corner portion and reaches the first position before the corner portion by a predetermined distance, and to progressively increase the amplitude of the vibration pattern until the machining head reaches a second position ahead of the corner portion by the predetermined distance from the corner portion, at a time of producing a product having the corner portion by cutting the sheet metal by irradiating the sheet metal with the laser beam vibrated in the vibration pattern; and
   a moving mechanism control section configured to replace a target position of the machining head specified to be the corner portion by a machining program with a compensation target position, and control the moving mechanism to move the machining head from the first position to the compensation target position, so that a locus of the laser beam by the vibration pattern in which the amplitude is progressively reduced from the first position to the corner portion, and the vibration pattern in which the amplitude is progressively increased from the corner portion to the second position moves along an end portion of the product.

2. The laser machining apparatus according to claim 1, wherein the vibration control section controls the beam vibrating mechanism to stop vibration of the laser beam by the vibration pattern at least at a time point when the laser beam is located at the corner portion.

3. A laser machining method, comprising:
   relatively moving, by a moving mechanism, a machining head emitting a laser beam, with respect to a sheet metal along a surface of the sheet metal;
   vibrating, by a beam vibrating mechanism, the laser beam for irradiation on the sheet metal in a predetermined vibration pattern, while the machining head is relatively moved by the moving mechanism;
   controlling, by a vibration control section, the beam vibrating mechanism to progressively reduce an amplitude of the vibration pattern from a first position to a corner portion when the machining head moves toward the corner portion and reaches the first position before the corner portion by a predetermined distance, and to progressively increase the amplitude of the vibration pattern until the machining head reaches a second position ahead of the corner portion by the predetermined distance from the corner portion, at a time of producing a product having the corner portion by cutting the sheet metal by irradiating the sheet metal with the laser beam vibrated in the vibration pattern; and
   by a moving mechanism control section, replacing a target position of the machining head specified to be the corner portion by a machining program with a compensation target position, and controlling the moving mechanism to move the machining head from the first position to the compensation target position, so that a locus of the laser beam by the vibration pattern in which the amplitude is progressively reduced from the first position to the corner portion, and the vibration pattern in which the amplitude is progressively increased from the corner portion to the second position moves along an end portion of the product.

4. The laser machining method according to claim 3, further comprising, by the vibration control section, controlling the beam vibrating mechanism to stop vibration of the laser beam by the vibration pattern at least at a time point when the laser beam is located at the corner portion.

\* \* \* \* \*